United States Patent [19]

Lyon

[11] 4,445,326
[45] May 1, 1984

[54] INTERNAL COMBUSTION ENGINE MISFIRE DETECTION SYSTEM

[75] Inventor: Harry H. Lyon, Farmington Hills, Mich.

[73] Assignee: General Motors Corporation, Detroit, Mich.

[21] Appl. No.: 380,630

[22] Filed: May 21, 1982

[51] Int. Cl.³ .......................................... F02B 75/10
[52] U.S. Cl. .................................. 60/277; 123/589; 73/117.3
[58] Field of Search ............... 123/425, 435, 440, 489, 123/589; 60/276, 277; 73/116, 117.3

[56] References Cited

U.S. PATENT DOCUMENTS

| | | | |
|---|---|---|---|
| 3,908,366 | 9/1975 | Masaki | 60/277 |
| 3,924,457 | 12/1975 | Oshima et al. | 60/277 |
| 3,983,754 | 10/1976 | Deguchi et al. | 60/277 |
| 4,006,718 | 2/1977 | Konomi | 123/489 |
| 4,040,294 | 8/1977 | Matsuda et al. | 73/117.3 |

*Primary Examiner*—Parshotam S. Lall
*Assistant Examiner*—W. R. Wolfe
*Attorney, Agent, or Firm*—Howard N. Conkey

[57] ABSTRACT

An internal combustion engine misfire detection system is described which counts the transitions in the output of an oxygen sensor in a closed loop air/fuel ratio controller over a predetermined time period and compares the transition count with a limit count determined to be the number which would occur at the engine speed during a misfire condition. When the number of transitions exceeds the limit count, a warning lamp is energized and secondary air to an oxidizing converter is diverted to the atmosphere.

4 Claims, 3 Drawing Figures

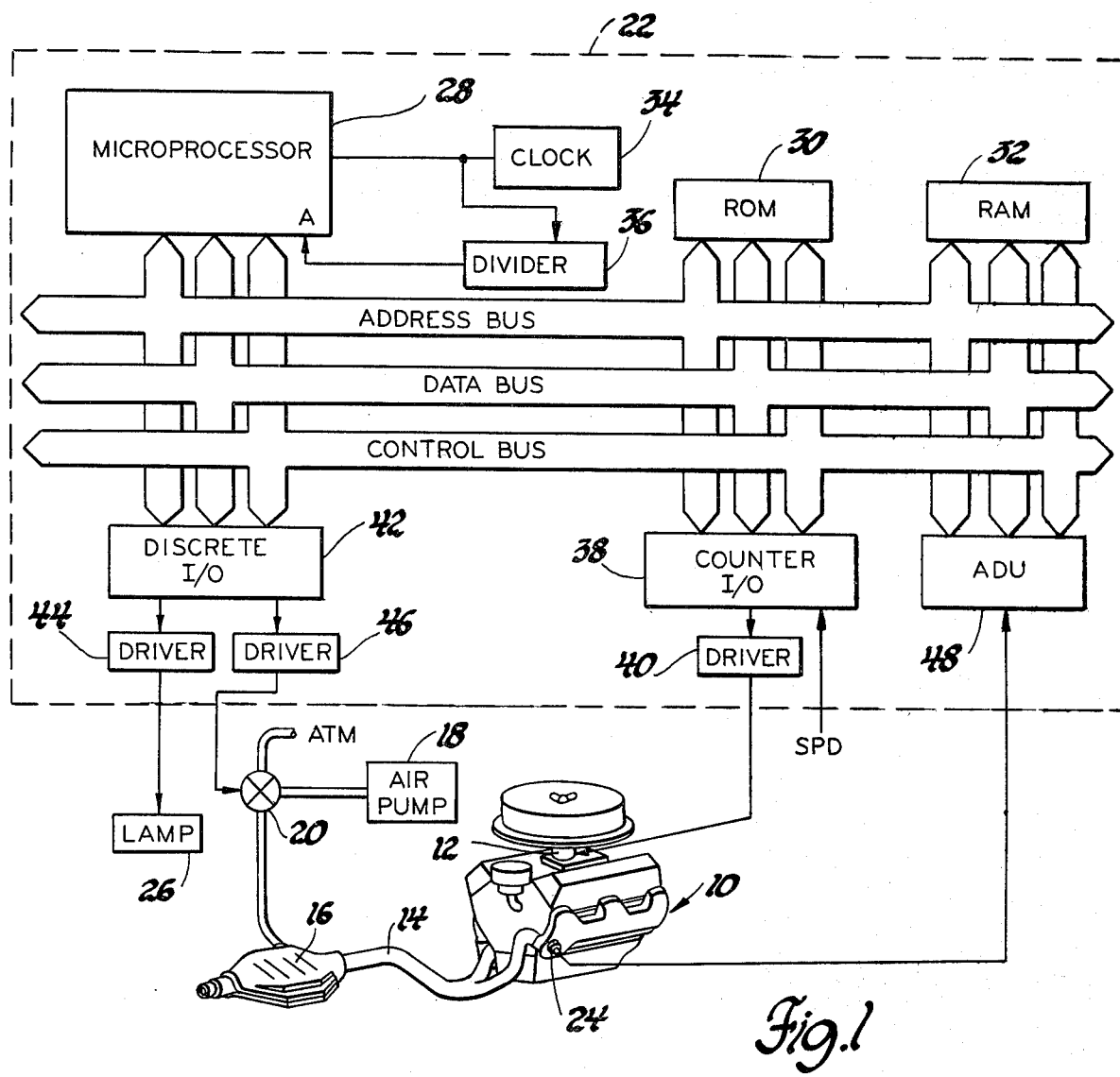
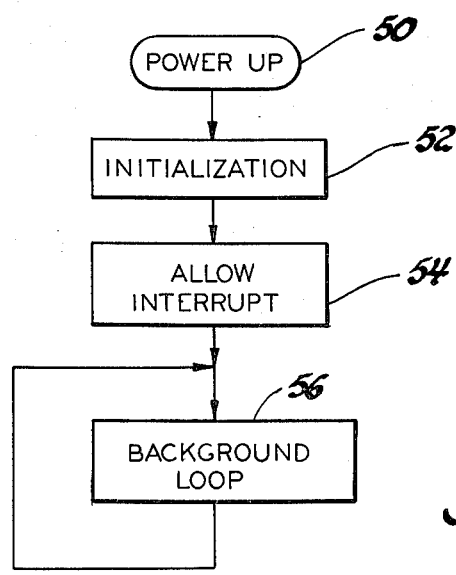
Fig.1
Fig.2

INTERNAL COMBUSTION ENGINE MISFIRE DETECTION SYSTEM

BACKGROUND OF THE INVENTION

This invention relates to a system for detecting a misfire condition in a multicylinder internal combustion engine.

If a cylinder misfire condition should occur during operation of an internal combustion engine that includes a catalytic converter to promote oxidation of hydrocarbon and carbon monoxide gases present in the exhaust gases, the unburned fuel that is discharged into the exhaust passage from the misfiring cylinder greatly increases the reaction temperature of the converter to an extent that may lead to structural failure. This is particularly the case in a system in which secondary air is supplied to the exhaust passage upstream of an oxidizing converter in order to provide an oxidizing atmosphere to promote the catalytic oxidation of the unburned hydrocarbon and carbon monoxide gases.

Typically, engine emission control systems include a three-way catalytic converter either alone or upstream from an oxidizing converter in the exhaust passage. The three-way catalytic converter accomplishes both the oxidation of carbon monoxide and hydrocarbon gases and reduction of nitrogen oxides when the air/fuel ratio of the mixture supplied to the engine is maintained at substantially a stoichiometric ratio. To maintain this required air/fuel ratio for three-way catalytic conversion, closed loop air/fuel ratio control systems are employed which include an oxygen sensor, such as a catalytically coated zirconium dioxide sensor, which monitors the exhaust gases discharged from the engine. This type of sensor behaves substantially as a switch and provides a bilevel signal indicating the rich or lean condition of the exhaust gases relative to a stoichiometric ratio. A controller typically including an integral control term monitors the output of the oxygen sensor and adjusts the air/fuel ratio of the mixture supplied to the engine in a direction to obtain a stoichiometric ratio.

SUMMARY OF THE INVENTION

In closed loop air/fuel ratio control systems as described above, the bilevel output signal of the oxygen sensor experiences transitions between rich and lean indicating states at a frequency that is primarily determined by the gas transport time between the fuel metering apparatus of the engine and the oxygen sensor. If one of the cylinders of the engine should experience a misfire condition, an unburned mixture of fuel and air is discharged into the engine exhaust passage at the frequency of operation of the misfiring cylinder. The oxygen sensor senses the unburned mixture of air and fuel as a mixture having excess oxygen, even though the actual air/fuel ratio of the unburned mixture from the misfiring cylinder is equal to or less than the stoichiometric ratio. Therefore, in the presence of the unburned mixture, the oxygen sensor will indicate a sensed lean air/fuel ratio. This characteristic of the oxygen sensor is primarily because the air and fuel mixture coming in contact with the oxygen sensor does not reach an equilibrium due to the limited rate of reaction of the catalytic surface of the zirconium dioxide sensor. The effect of this response of the sensor to unburned fuel and air is that the closed loop controller adjusts the air/fuel ratio of the mixture supplied by the fuel metering means to an average rich value during a cylinder misfire condition and the output of the sensor experiences a rich-to-lean transition when the misfiring cylinder discharges a mixture of fuel and air into the exhaust passage and experiences a lean-to-rich transition upon the passing of the unburned mixture. Therefore, when a cylinder misfire condition exists, the frequency of the transitions of the output of the oxygen sensor between rich and lean states during a misfire condition increases from the normal limit cycle frequency determined by the gas transport delay time to a frequency that is primarily determined by the frequency of operation of the misfiring cylinder.

In accord with this invention, the engine speed is detected and the frequency of the transitions in the output of the oxygen sensor between rich and lean states which would occur during a cylinder misfire condition at that engine speed is determined. When the frequency of the rich-lean transitions in the output signal from the oxygen sensor attains the determined value, an engine misfire condition is indicated. In a preferred embodiment, the number of transitions of the oxygen sensor output signal between rich and lean states which would occur in response to a misfire condition over a predetermined time period is calculated. The actual transitions in the output signal of the oxygen sensor are counted over that predetermined time period and if the number exceeds the calculated value, an engine misfire condition is indicated.

It is the general object of this invention to provide for an improved engine misfire detector.

It is another object of this invention to provide for a system for determining an internal combustion engine misfire condition in response to the transition frequency of the output of an oxygen sensor monitoring the oxidizing/reducing condition of the exhaust gases discharged from the internal combustion engine.

It is another object of this invention to provide for an engine misfire detection system in which the frequency of the rich-lean transitions in the output of an oxygen sensor monitoring the oxidizing/reducing condition in the exhaust gases which would exist during a misfire condition is determined from the value of the engine speed and wherein an engine misfire condition is detected when the actual frequency of transitions in the output of the oxygen sensor attains the determined value.

DESCRIPTION OF THE DRAWINGS

The foregoing and other objects of this invention may be best understood by reference to the following description of a preferred embodiment of the invention and the drawings, in which:

FIG. 1 illustrates a digital system for detecting a misfire condition in an internal combustion engine in accord with the principles of this invention; and FIGS. 2 and 3 are diagrams illustrative of the operation of the digital system of FIG. 1 in detecting an engine misfire condition.

DESCRIPTION OF THE PREFERRED EMBODIMENT

Figure 3:
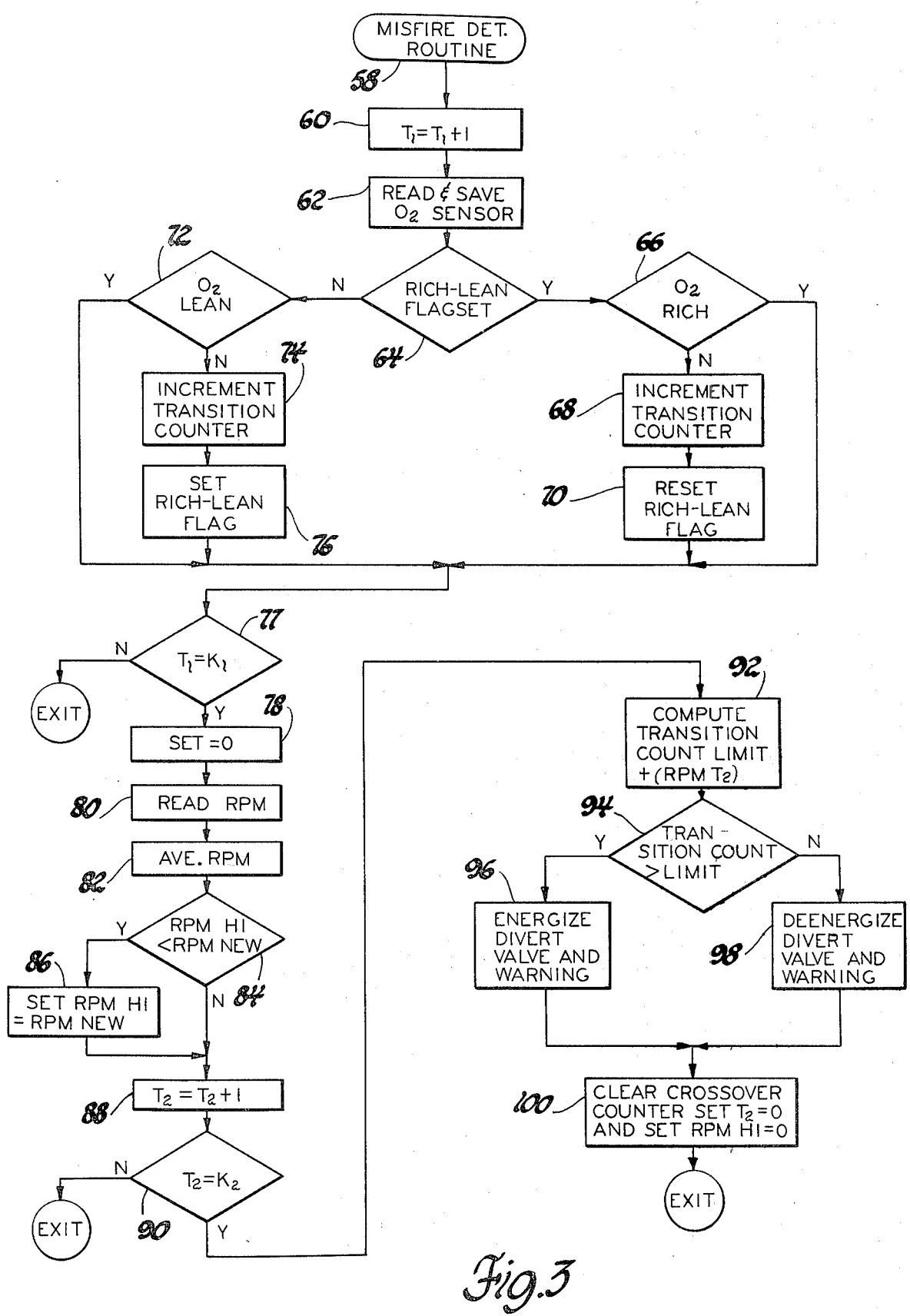

Referring to FIG. 1, an internal combustion engine 10 is supplied with a controlled mixture of fuel and air by a carburetor 12. The combustion byproducts from the engine 10 are exhausted to the atmosphere through an exhaust conduit 14 which includes a dual bed catalytic converter 16. The dual bed catalytic converter 16 is of the known type which includes a three-way catalytic converter for promoting simultaneous oxidation of hydrocarbon and carbon monoxide gases and reduction of nitrogen oxides when the air/fuel ratio of the mixture supplied to the engine 10 is at a stoichiometric ratio. The dual bed catalytic converter 16 also contains an oxidizing converter downstream of the three-way catalytic converter for further oxidizing the hydrocarbon and carbon monoxide gases present in the exhaust gases. In order to enhance oxidation of the hydrocarbon and carbon monoxide gases, an air pump 18 is provided which is driven by the internal combustion engine 10 and which supplies air via a two-way electromagnetic valve 20 to a location between the three-way and oxidizing converters in the dual bed converter 16. This air provides an oxygen rich environment to promote oxidation of the unburned hydrocarbon and carbon monoxide gases in the oxidizing catalytic converter.

A digital computer system 22 controls the air/fuel ratio of the mixture supplied by the carburetor 12 to the internal combustion engine 10 to a stoichiometric ratio as sensed by an oxygen sensor 24 which is positioned to sense the exhaust gases discharged from the engine 10 upstream of the catalytic converter 16. The sensor 24 is preferably a zirconium dioxide sensor which generates a bilevel output voltage that is at a high voltage value when the air/fuel mixture is richer than the stoichiometric ratio and which provides a low voltage value when the air/fuel mixture is leaner than the stoichiometric ratio.

The digital computer 22 also responds to the speed of the engine 10 provided by a conventional speed transducer and to the output of the oxygen sensor 24 to detect when an engine misfire condition exists. When such a condition exists, the computer 22 energizes the electromagnetic valve 20 to divert the air from the air pump 18 to the atmosphere so as to minimize the increase in the reaction temperature of the oxidizing converter in the dual bed converter 16 during the engine misfire condition. The computer 22 also energizes a warning lamp 26 when an engine misfire condition is detected to warn the vehicle operator of the engine misfire condition.

The digital computer 22 includes a microprocessor 28 which executes the various sensing and control functions by executing an operating program permanently stored in an external read only memory (ROM) 30. Internal to the microprocessor 28 are conventional counters, registers, accumulators, flag flip flops, etc.

The digital computer 22 also includes a random access memory (RAM) 32 into which data may be temporarily stored and from which data may be read at various address locations determined in accord with the program stored in the ROM 30.

A clock oscillator 34, which establishes the timing of the digital computer, supplies a clock signal to the microprocessor 28 and to a divider 36 which issues a periodic interrupt pulse to a maskable interrupt input A of the microprocessor 28. These interrupt pulses may be spaced at, for example, 12½ millisecond intervals.

A counter input/output circuit 38 is provided having an output counter section for providing timed output pulses to the carburetor 12 via a driver circuit 40. These timed pulses may be provided at 100 millisecond intervals with the pulses having durations determined by the digital computer 22 to adjust the carburetor 12 to supply a stoichiometric mixture to the engine 10 in response to the output of the oxygen sensor 24.

The input/output circuit 38 also includes an input counter section which counts input engine speed pulses for a predetermined time period or, alternatively, counts clock pulses between input engine speed pulses for measuring engine speed. In this respect, the engine speed input may take the form of a pulse output of an electromagnetic sensor sensing the rotation of the teeth of the ring gear of the engine 10.

A discrete input/output circuit 42 is provided having an output section for issuing output discrete signals. For example, the output section may include flip flops that are selectively set to provide output signals to energize selected external devices and reset to deenergize selected external devices. One such discrete output is applied via a driver circuit 44 to the lamp 26 for energizing the lamp 26 as a warning in response to a detected engine misfire condition. A second such output is applied via a driver circuit 46 to energize the electromagnetic valve 20 in response to a sensed engine misfire condition to divert the air from the air pump 18 to the atmosphere and away from the dual bed converter 16. In the absence of a detected engine misfire condition, the discrete input/output circuit 42 deenergizes the electromagnetic valve 20 to supply air from the air pump 18 to the dual bed converter 16 as previously described to promote oxidation of the hydrocarbon and carbon monoxide gases in the oxidizing converter.

An analog-to-digital converter (ADU) 48 provides for the measurement of analog signals. In the present embodiment, a single analog voltage is illustrated as being supplied to the ADU 48 from the oxygen sensor 24. Other analog signals such as engine temperature may be provided if desired. The analog signals supplied to the ADU 48 are each sampled and converted under control of the microprocessor 28. The conversion process is initiated on command from the microprocessor 28 which selects the particular analog input channel to be converted. At the end of the conversion cycle, the ADU 48 generates an interrupt after which the digital data is read over the data bus on command from the microprocessor 28 and stored in ROM designated memory location in the RAM 32.

The various elements of the digital computer 22 are interconnected by an address bus, a data bus and a control bus. The microprocessor 28 accesses the various circuits and memory locations in the ROM 30 and the RAM 32 via the address bus. Information is transmitted between the circuits via the data bus and the control bus includes conventional lines such as read-write lines, reset lines, clock lines, power supply lines, etc.

The operation of the digital computer 22 in detecting an engine misfire condition in accord with the principles of this invention is illustrated in the FIGS. 2 and 3. Referring first to FIG. 2, when power is first applied to the system such as by operation of the ignition switch (not shown), the computer program is initiated at point 50 and then proceeds to a step 52 where the computer provides for system initialization. At this step, initial values stored in the ROM 30 are entered into ROM designated locations in the RAM 32 and counters, flags, and timers are initialized. After the initialization step 52, the program proceeds to a step 54 where the program allows interrupts to occur such as by resetting the interrupt mask bit in the microprocessor condition code register. After the step 54, the program shifts to a background loop 56 which is continuously repeated. This loop may include execution of routines such as certain diagnostic and warning routines.

While the system may employ numerous program interrupts at various spaced intervals, it will be assumed for purposes of illustrating this invention that an interrupt A is provided at 12½ millisecond intervals by means of the divider 36 of FIG. 1 during which various routines including the engine misfire routine of this invention is executed. Additionally, an air/fuel ratio control routine may be executed after a predetermined number of interrupts has occurred. For example, the routine for adjusting the air/fuel ratio in response to the output of the oxygen sensor 24 may be executed at intervals spaced by 8 interrupt pulses. This may be done by simply counting the interrupt pulses and enabling the execution of the air/fuel ratio control routine when 8 interrupts have occurred.

The routine for controlling the air/fuel ratio of the mixture supplied to the engine 10 by the carburetor 12 and in response to the sensor 24 may take the form of the air/fuel ratio control routine illustrated in U.S. Pat. No. 4,224,910 assigned to the assignee of this invention. In general, a characteristic of closed loop air/fuel ratio controllers responding to the bilevel output of a sensor such as the oxygen sensor 24 is that the air/fuel ratio limit cycles about the stoichiometric ratio at a frequency substantially determined by the gas transport delay from the carburetor 12 through the engine 10 and to the exhaust gas sensor 24. The frequency of the transitions in the oxygen sensor 24 output between rich and lean states during normal engine operation is therefore substantially determined by the gas transport delay. However, as previously described, when a cylinder misfire condition occurs, the output of the sensor 24 changes between rich and lean states at a frequency that is substantially controlled by the frequency of operation of the misfiring cylinder and therefore engine speed. The misfire detection routine of FIG. 3 that is executed during each 12-½ millisecond interrupt period detects a misfire condition in response to the sensed engine speed and the frequency of the rich-lean transitions in the output of the oxygen sensor 24.

Referring to FIG. 3, there is illustrated the misfire detection routine. In general, this loop (A) samples the rich-lean state of the oxygen sensor 24 output signal during each interrupt interval (12.5 msec in this embodiment) and totalizes the sensed rich-lean transitions, (B) samples and averages engine speed at $K_1$ interrupt intervals, where $K_1$ may be, for example, 8 so that engine speed is sampled and averaged at 100 msec intervals, and (C) compares the totalized sensed rich-lean transitions that occur during a period of $(K_2)$ $(K_1)$ interrupt intervals with a number of transitions which would occur at the sensed engine speed during a misfire condition to determine if a misfire condition exists, where $K_2$ may be 50 so that the rich-lean transitions are totalized over 5 second intervals.

The misfire detection loop is entered at point 58 and proceeds to a step 60 where a timing register in the RAM 32 containing a count $T_1$ of the interrupt intervals is incremented. The program then executes a read routine at step 62 to sense the rich or lean state of the output of the exhaust gas sensor 24. This is accomplished by commanding the ADU 48 to convert the output of the sensor 24 to a digital value which is read and compared with a threshold value to determine if the sensed air/fuel ratio is rich or lean. The determined rich or lean state is then stored in a ROM designated location in the RAM 32.

Following step 62, the program executes a series of steps to determine if a rich-lean transition has occurred and increments a transition counter in the RAM 32 if a transition is detected. This series of steps begins at a decision point 64 where the rich or lean state of the sensed air/fuel ratio during the prior interrupt interval as represented by the state of a rich-lean flag is sampled. This flag is in a set state if during the prior interrupt interval the output of the oxygen sensor 24 indicated a rich air/fuel ratio and is in a reset state if during the prior interrupt interval the output of the oxygen sensor 24 indicated a lean air/fuel ratio. Assuming the rich-lean flag is set indicating the sensor 24 sensed a rich air/fuel ratio during the prior interrupt interval, the program proceeds to a decision point 66 where the current sensed rich-lean state of the air/fuel ratio stored in the RAM 32 at step 62 is read. If the state of the air/fuel ratio stored at step 62 was lean, the output of the sensor 24 has experienced a rich-to-lean transition and the program proceeds to a step 68 where the transition counter in the RAM 32 is incremented. From step 68 the program proceeds to step 70 where the rich-lean flag is reset to indicate a lean air/fuel ratio in preparation for the execution of the misfire detection routine during the next interrupt interval.

Returning again to decision point 64, if the rich-lean flag is reset indicating the sensor 24 sensed a lean air/fuel ratio during the prior interrupt interval, the program proceeds from decision point 64 to a decision point 72 where the current rich or lean state of the sensor 24 signal stored in the RAM 32 at step 62 is read. If the state of the air/fuel ratio stored at step 62 was rich, the output of the sensor 24 has experienced a lean-to-rich transition and the program proceeds to a step 74 where the transition counter in the RAM 32 is incremented. Thereafter, the program proceeds to a step 76 where the rich-lean flag is set to indicate a rich air/fuel ratio in preparation for the execution of the misfire detection routine during the next interrupt interval.

From decision point 66 or 72 if there was no detected rich-lean transition in the output of the sensor 24 or from step 70 or 76 if there was a detected transition, the program proceeds to a decision point 77 where the count $T_1$ in the timing register in the RAM 32 is read and compared to the value $K_1$ representing the engine speed sampling interval. If $T_1$ is less than $K_1$ interrupt intervals, the program exits the misfire detection routine. The foregoing steps 58 through 77 are repeated with each 12½ millisecond interrupt until $T_1$ is incremented at step 60 to the value $K_1$. When this condition exists, the program proceeds from decision point 77 to a step 78 where the $T_1$ timing register is reset to zero to begin a new engine speed sampling interval.

From step 78, the program proceeds to step 80 where the value of engine speed is determined from the counter input/output circuit 38. This value is then used in step 82 to determine the average value of the engine speed. In this embodiment, the average speed is determined from a first-order lag equation. As previously indicated, engine misfire detection is based upon the number of rich-lean transitions of the output signal from the sensor 24 that would occur during a cylinder misfire condition over a predetermined time period. This number is directly proportional to engine speed. To ensure against a false detection of engine misfire, the number of rich-lean transitions in the output of the sensor 24 that would occur if a cylinder misfire condition existed is determined based on the highest value of average engine speed that existed over the predetermined time period. This highest average value of engine speed is determined and stored in the RAM 32 by the program steps 84 and 86. At step 84, the average engine speed determined at step 82 is compared with the highest value of engine speed currently stored in the RAM 32. If the stored highest average speed value is less than the new average engine speed value determined at step 82, the program proceeds to the step 86 where the stored highest engine speed value is set to the new higher value.

From step 86 or from decision point 84 if the old value of the average engine speed is greater than the value calculated at step 82, the program proceeds to a step 88 where a timing register containing a count $T_2$ of the number of $K_1$ interrupt intervals is incremented. The count $T_2$ is compared at step 90 with the constant value $K_2$ representing the rich-lean transition counting interval. If the count $T_2$ is less than $K_2$, the program exits the misfire detection routine. However, if $T_2$ is equal to $K_2$, the program proceeds to determine if a misfire condition exists.

At the next step 92, the program determines a transition count limit based upon the number of rich-lean transitions that would occur in the output of the oxygen sensor 24 if a cylinder is experiencing a misfire condition over the time interval defined by $K_2$. Assuming the engine speed is measured in revolutions per minute and assuming the dimension of $K_2$ is seconds, the transitions count limit is determined from the following expression:

$$K_4 \left[ \frac{K_3 \text{REV.}}{\text{MIN.}} \times \frac{1 \text{ MIN}}{60 \text{ SEC.}} \times \frac{1 \text{ MISSING CYLINDER}}{2 \text{ ENGINE REV.}} \times K_2 \text{ SEC.} \right]$$

where $K_3$ is the highest average engine speed value established at steps 84 and 86 over the time interval defined by $K_2$ and $K_4$ is a constant establishing a transition level above which a misfire condition is to be indicated. In one embodiment, $K_4=0.75$.

Following step 92, the program proceeds to decision point 94 where the transition count limit is compared with the actual transition count in the transition counter. If the actual transition count is greater than the limit determined at step 92, an engine misfire condition exists and the program proceeds to a step 96 where the warning lamp 26 is energized and the electromagnetic valve 20 is energized to divert the air from the air pump 18 to the atmosphere. If the actual transition count in the transition counter is less than the limit count, the program proceeds from point 94 to a step 98 where the lamp 26 and the electromagnetic valve 20 are deenergized. From steps 96 and 98, the program proceeds to a step 100 where the increment counter is cleared, the stored value of the highest engine speed average is set to zero, and the $T_2$ timing register is reset to initialize the system for a new transition count interval. From step 100, the program exits the misfire detection routine.

The foregoing description of a preferred embodiment for the purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. The method of detecting a misfire condition in an internal combustion engine having cylinders into which an air-fuel mixture is drawn and ignited to undergo combustion, an exhaust passage and an oxygen sensor disposed in the exhaust passage that provides a signal having a rich or lean state representing the sensed lean or rich condition of the exhaust gases, the oxygen sensor being characterized in that it provides the signal in its lean state when exposed to an unburned mixture of air and fuel, the method comprising the steps of:

sensing engine speed;

determining from the sensed engine speed the number of transitions between the oxygen sensor signal rich and lean states over a predetermined time period that represents an engine misfire condition;

counting the transitions between the oxygen sensor signal rich and lean states over the predetermined time period; and providing a misfire signal when the number of transitions counted is equal to or greater than the determined number representing an engine misfire condition.

2. A misfire detection system for use with a motor vehicle internal combustion engine having cylinders into which an air-fuel mixture is drawn and ignited to undergo combustion, an exhaust passage, and an oxygen sensor disposed in the exhaust passage that provides a signal representing the lean or rich state of the exhaust gases, the exhaust sensor being characterized in that it provides a signal representing a lean state when the sensor is exposed to an unburned mixture of air and fuel, the system comprising:

means effective to sense engine speed;

means responsive to the sensed engine speed effective to provide a transition limit number that is the number of transitions between the oxygen sensor signal rich and lean states over a predetermined time period that represents an engine misfire condition;

means effective to count the number of transitions between the oxygen sensor signal rich and lean states over the predetermined time period; and means effective to provide an engine misfire signal when the counted number of transitions is equal to or greater than the transition limit number representing an engine misfire condition.

3. A misfire detection system for use with a motor vehicle internal combustion engine having cylinders into which an air-fuel mixture is drawn and ignited to undergo combustion, an exhaust passage, and a closed loop air/fuel ratio controller including an oxygen sensor disposed in the exhaust passage that provides a signal representing the oxidizing or reducing state of the exhaust gases, the oxygen sensor providing a signal representing an oxidizing state when the sensor is exposed to an unburned mixture of air and fuel, the system comprising:

means effective to detect the frequency of the changes between the oxidizing and reducing states of the exhaust gases as represented by the oxygen sensor signal, the detected frequency being substantially less than the frequency of the combustion events in one of the cylinders during normal engine operation;

means responsive to the speed of the engine effective to provide an engine cylinder combustion signal related to the cylinder combustion frequency; and means effective to provide an engine misfire signal when the detected frequency of the changes between the oxidizing and reducing states of the exhaust gases represented by the oxygen sensor signal attains a predetermined relationship to the engine cylinder combustion signal.

4. A misfire detection and protection system for use with a motor vehicle internal combustion engine having cylinders into which an air-fuel mixture is drawn and ignited to undergo combustion, an exhaust passage, an oxidizing catalytic converter, air supply means for providing secondary air to the exhaust passage at an air intake point upstream of the converter to establish an oxidizing atmosphere to promote oxidation of certain exhaust gas constituents, and a closed loop air-fuel ratio controller including an oxygen sensor disposed in the exhaust passage upstream of the air intake point that provides a signal representing the oxidizing or reducing state of the exhaust gases, the oxygen sensor providing a signal representing an oxidizing state when the sensor is exposed to an unburned mixture of air and fuel, the system comprising:

means effective to detect the frequency of the changes between the oxidizing and reducing states of the exhaust gases as represented by the oxygen sensor signal, the detected frequency being substantially less than the frequency of the combustion events in one of the cylinders during normal engine operation;

means responsive to the speed of the engine effective to provide an engine cylinder combustion signal related to the cylinder combustion frequency;

means effective to provide an engine misfire signal when the detected frequency of the changes between the oxidizing and reducing states of the exhaust gases represented by the oxygen sensor signal attains a predetermined relationship to the engine cylinder combustion signal; and means responsive to the engine misfire signal effective to inhibit admission of air from the air supply means to the air intake point so as to prevent overheating of the oxidizing catalytic converter during the engine misfire condition.

* * * * *